D. A. Dacey,
Boiler-Tube Cutter.
N° 48,054. Patented June 6, 1865.

Witnesses:
J. P. Hall.
C. S. Topliff

Inventor:
D. A. Dacey
per Munn & Co.
Attorneys

UNITED STATES PATENT OFFICE.

DENNIS A. DACEY, OF NEW YORK, N. Y.

IMPROVED TOOL FOR CUTTING OFF BOILER-TUBES.

Specification forming part of Letters Patent No. 48,054, dated June 6, 1865.

*To all whom it may concern:*

Be it known that I, DENNIS A. DACEY, of the city, county, and State of New York, have invented a new and useful Improvement in Tools for Cutting Off Boiler-Tubes and for other Purposes; and I do hereby declare that the following is a full, clear, and exact description thereof, which will enable others skilled in the art to make and use the same, reference being had to the accompanying drawings, forming part of this specification, in which—

Figure 1:
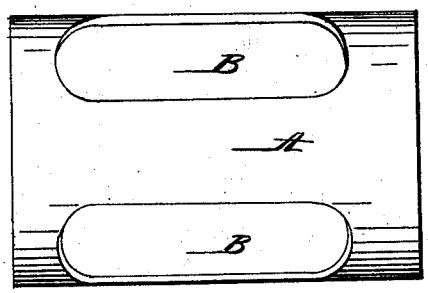
Figure 2:
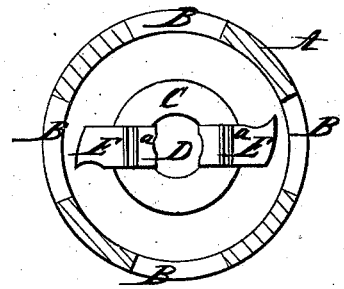
Figure 3:
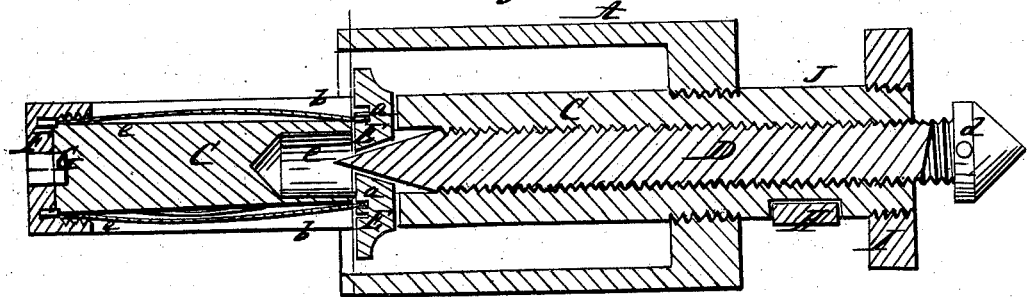

Figure 1 represents the guard of the tool detached. Fig. 2 is a cross-section taken on the line $x$ of Fig. 3. Fig. 3 is a longitudinal axial section of the tool.

Similar letters of reference indicate like parts.

This invention has for its object the construction of a tool for cutting off boiler-tubes, and which can be used for chasing and for tapping holes, and also for drilling and reaming holes in metal, and, in general, for any use wherein a tool can be operated by a pawl-wrench. In cutting off boiler-tubes it is desirable to cut them evenly and without jamming or opening the joints formed between their sides and the boiler-plates. My invention is well adapted for this work, and by its means I am also enabled to perform other work of that kind which usually is or can be executed by means of a ratchet-drill or pawl-wrench.

C is a stock or body upon whose right-hand end is fixed a collar, I.

A is a cylindrical guard, made solid, or, as in this example, with openings B through its sides. The head of the guard is fixed to the outside of the stock by means of a screw-thread joint, and its open end extends around the stock to a point beyond the cutters E. The position of the head of the guard on the stock is such as to leave a space, J, which I call a "neck," between the guard and the collar I, which neck carries a stop or dog, by means of which a pawl-wrench may be applied to the tool to give it rotary motion.

The stock C is perforated from the right-hand end with a hole, $e$, which extends a sufficient distance beyond the place of the cutters E to permit the necessary advance of the rod D. This rod has a screw-thread cut upon it, and it works in a screw-thread tapped in the hole $e$ of the stock. It has also a cap at its outer end, which is pierced with several holes, $d$, one of which is shown in the drawings, to enable the workman to turn it in the stock. Its end is brought to the form of a cone with smooth sides. The sides of the stock at a point within the end of the guard have openings opposite to each other to receive cutters E, which project radially through the sides of the stock. The bases of their shanks are tapered or inclined to the angle of the conical end of the rod D, and they are also grooved in the direction of such inclinations, as seen in the cross-section, Fig. 2, where the tapered end of the rod D is shown in place between the cutters.

$b\ b$ are grooves cut in the stock, extending from the sockets of the cutters to its left-hand end to receive plates $c\ c$, whose inner ends take into recesses $a\ a$, made in the adjacent sides of the bodies of the cutters, and whose outer ends are clamped by a cap, F, screwed on the left-hand end of the stock. The office of these plates is to hold the cutters down upon the sides of the rod D and to keep them in their proper places, and they act as spring-holders in the arrangement here shown. I do not confine myself to this mode of retaining the cutters in place, but I have shown this mode of retaining them and holding them down upon the rod D when it is receding and when it is advancing as an illustration of this part of my invention. The left-hand end of the stock and its cap have a socket, G, to receive the shank of a drill or any other tool which can be operated from such a point.

The cutters E are not here shown with cutting-edges as ready for work, because I do not claim the form of their cutting-edges. Any form or size of cutter E may be used, the sockets in the stock being properly prepared as to size and shape to receive them, and as many such cutters may be used in the same tool as is found convenient and useful. The shape of the cutters, moreover, will be varied according to the nature of the work to be done—as, for instance, for the purpose of making a tap, or for chasing or for reaming, or for cutting off boiler-tubes or other work which can be done by means of a tool-holder having rotary motion. I have shown it in this example arranged for cutting off boiler-tubes, and its operation in doing that work is as follows: The left-hand end of the stock C is inserted into the projecting end of the tube to be cut off until the guard A is in contact with the boiler plate or sheet, the end of the boiler-tube being received between the guard and the stock.

The guard may, if it is thought desirable, be secured or clamped to the outside of the tube by means of set-screws or spring-clamps or other ordinary devices; but in ordinary work the tool can be held by the workmen squarely and steadily without such aids. A pawl-wrench is then applied to the neck J of the stock, and rotation is given to the implement in the usual manner, the screw-rod D being advanced gradually, so as to keep the cutters E up against the inside of the tube to be cut off.

The openings B in the guard enable the workmen to inspect the work and to see when it is completed.

The guard A is to be suited and adjusted to the work to be inclosed within it, and it can be made to project more or less beyond the cutters by means of the screw-thread joint, by which it is secured to the stock.

I claim as new and desire to secure by Letters Patent—

The implement herein described, constructed and operated substantially in the manner set forth, for cutting off boiler-tubes and for other work.

DENNIS A. DACEY.

Witnesses:
M. M. LIVINGSTON,
C. L. TOPLIFF.